(12) United States Patent
Fuetterer et al.

(10) Patent No.: US 8,956,469 B2
(45) Date of Patent: Feb. 17, 2015

(54) VEHICLE BODY COMPONENTS WITH A METAL HYBRID CONSTRUCTION AND PRODUCTION METHODS FOR SUCH VEHICLE BODY COMPONENTS

(75) Inventors: Michael Fuetterer, Hildrizhausen (DE); Alfons Honsel, Grafenau (DE); Asa Bengtsson, Stuttgart (DE); Leonid Levinski, Brussels (BE); Victor Samoilov, Brussels (BE); Martin Brodt, Weil der Stadt (DE); Alexandre Ivlev, Gages (BE); Igor Kireev, Uccle (BE)

(73) Assignee: Thermission AG, Engelberg/OW (CH)

( * ) Notice: Subject to any disclaimer, the term of this patent is extended or adjusted under 35 U.S.C. 154(b) by 1110 days.

(21) Appl. No.: 12/866,459

(22) PCT Filed: Nov. 25, 2008
(Under 37 CFR 1.47)

(86) PCT No.: PCT/EP2008/009959
§ 371 (c)(1),
(2), (4) Date: Mar. 4, 2011

(87) PCT Pub. No.: WO2009/097882
PCT Pub. Date: Aug. 13, 2009

(65) Prior Publication Data
US 2012/0112486 A1 May 10, 2012

(30) Foreign Application Priority Data

Feb. 7, 2008 (DE) .................. 10 2008 007 977

(51) Int. Cl.
*C23C 10/34* (2006.01)
(52) U.S. Cl.
USPC ............ 148/281; 148/240; 420/427; 428/432
(58) Field of Classification Search
USPC ................... 148/240, 281; 420/427; 428/432
See application file for complete search history.

(56) References Cited

U.S. PATENT DOCUMENTS

| 5,176,963 | A | * | 1/1993 | Koyama et al. ............... 428/546 |
| 6,171,359 | B1 | * | 1/2001 | Levinski et al. ............... 75/252 |
| 2002/0069940 | A1 | | 6/2002 | Matsunaga |
| 2005/0109433 | A1 | | 5/2005 | Danger |
| 2012/0021240 | A1 | | 1/2012 | Urushihara et al. |

FOREIGN PATENT DOCUMENTS

| DE | 198 24 932 A1 | 12/1998 | |
| DE | 199 39 977 A1 | 3/2001 | |
| DE | 103 48 086 A1 | 5/2005 | |
| DE | 10 2004 004 386 A1 | 8/2005 | |
| DE | 2004 035 049 A1 | 8/2005 | |
| GB | 131 047 A | 8/1919 | |
| GB | 498 371 A | 1/1939 | |
| JP | 55 042181 A | 3/1980 | |
| JP | 2004-223548 | * | 8/2004 | ............ B23K 26/00 |
| RU | 2 174 159 C1 | 9/2001 | |
| UA | 75 728 C2 | 5/2006 | |
| WO | WO 03/000948 A1 | 1/2003 | |
| WO | WO 2007/097378 A1 | 8/2007 | |

OTHER PUBLICATIONS

DIN EN 13811.
"Phosphatieren: Korrosions-Stop für alle Industrie-Metalle", Innovations Report, Oct. 13, 2006, XP002519274 Internet: http://www.innovations-report.de/html/berichte/verfahrenstechnologie/bericht-72048.html.
L. S. Lyakhovich et al.: "Diffusion Zinc-Plating of Aluminum Alloys", Belorussian Polytechnic Institute, Plenum Publishing Corporation, No. 6, pp. 62-64 (Jun. 1985).

* cited by examiner

*Primary Examiner* — Lois Zheng
(74) *Attorney, Agent, or Firm* — Norman B. Thot

(57) ABSTRACT

Method for manufacturing a zinc-coated nonferrous metal component for the production of a corrosion-protected vehicle body in a mixed construction includes providing an untreated nonferrous metal component and applying a coating by zinc diffusion onto the nonferrous metal component. A zinc dust mixture is diffused at a temperature of from 300 to 600° C. so as to form a zinc diffusion layer.

12 Claims, No Drawings

VEHICLE BODY COMPONENTS WITH A METAL HYBRID CONSTRUCTION AND PRODUCTION METHODS FOR SUCH VEHICLE BODY COMPONENTS

CROSS REFERENCE TO PRIOR APPLICATIONS

This application is a U.S. National Phase application under 35 U.S.C. §371 of International Application No. PCT/EP2008/009959, filed on Nov. 25, 2008 and which claims benefit to German Patent Application No. 10 2008 007 977.4, filed on Feb. 7, 2008. The International Application was published in German on Aug. 13, 2009 as WO 2009/097882 A1 under PCT Article 21(2).

FIELD

The present invention provides a method for manufacturing zinc-coated components from nonferrous metals, for example, from light metal alloys such as Al-, Ti- or Mg-alloys or copper and Cu alloys, by means of thermal diffusion. The present invention further provides vehicle body components in metal hybrid construction or mixed construction made of steel and of light metal coated with Zn by thermal diffusion which have improved corrosion protection.

BACKGROUND

In the manufacturing of vehicles, the aspect of lightweight design has led to increasing use of hybrid constructions for the vehicle body. Typical variants in this regard are components of the outer skin of the vehicle body which are made of a light-weighted metallic material (for example, an aluminum alloy), optionally with reinforcement members of steel material, and which are arranged on steel frame constructions. Alternatively, as described, for example, in DE 198 24 932 A1, the outer skin component can consist of sheet metal while the reinforcement member is made of a light metal alloy. Further, the frame construction (such as the space frame) can be realized in mixed construction. DE 10 2004 004 386 describes examples of mixed construction of covering parts for use as components of the vehicle body.

For lightweight design, use is made of lightweight metallic materials, for example, Al alloys, which have distinctly lower corrosion rates than steels. In this case, the light metals will normally not require a special anti-corrosion layer. In practice, however, the composite material comprising the electro-chemically base light metal alloys and the low-alloy steels commonly used in the construction of car bodies will cause corrosion problems due to the different electrochemical potentials of the materials.

For this reason, contact or joint regions between the different materials require considerable expenditure to protect them from contact corrosion. This holds true, for example, for vehicle bodies which are typically exposed to an ingress of corrosive aqueous media. In this regard, a typical measure in vehicle construction is seam sealing wherein a special plastic sealing is applied on the joint seam between the two materials.

When connecting the joints, use must frequently be made of bonding so as to prevent direct electrochemical contact between the different materials. This is described, for example, in DE 19939977 A1.

A further composite material which causes problems due to contact corrosion is a mixed construction of steel and copper. In such a construction, the Cu alloy, when compared to the steel, is the more precious component. Here the contact site must also be protected against the formation of a local element by use of special measures.

With regard to the demands on reliable and inexpensive corrosion protection, for example, in the regions of joints, the known techniques and methods for manufacturing vehicle body components or the basic structure of the vehicle body by utilizing mixed-construction technology are, now as before, unsatisfactory.

SUMMARY

An aspect of the present invention is to provide a component, for example, a vehicle body component for motor vehicles, in mixed construction made of steels and light metal alloys or copper alloys, which component provides improved corrosion resistance in the joint regions. A further aspect of the present invention is to provide a method for providing suitable components of nonferrous metal for such mixed-construction designs.

In an embodiment, the present invention provides a method for manufacturing a zinc-coated nonferrous metal component for the production of a corrosion-protected vehicle body in a mixed construction which includes providing an untreated nonferrous metal component and applying a coating by zinc diffusion onto the nonferrous metal component. A zinc dust mixture is diffused at a temperature of from 300 to 600° C. so as to form a zinc diffusion layer.

DETAILED DESCRIPTION

A thermal diffusion method, hereunder referred to as a zinc diffusion method or a zinc thermodiffusion method, is provided as a method for manufacturing zinc-coated components from nonferrous metals, for example, for the production of corrosion-protected vehicle bodies in mixed construction. Concerning the zinc diffusion method, use is made of already-existing thermal diffusion methods for the Zn coating of ferrous metals or steels. These methods are in principle based on the sherardizing method for steel materials as described in DIN EN 13811, which is known for use in small parts and bulk material. In sherardizing, the small parts are heated in close contact with zinc dust and with an inert filler material such as, for example, sand, thereby initiating a solids diffusion of the Zn into the steel surface. By sherardizing, a coating of a zinc-iron alloy and, respectively, different intermetallic Fe—Zn phases are generated on the components. A suitable base material for the iron as described in DIN EN 13811 includes unalloyed carbon steels or weakly alloyed steels.

Additional variants of this thermal diffusion method for steels are described, for example, in DE 103 48 086 A1, RU 2 174 159, DE 10 2004 035 049 B4 or UA 75728 for the coating of steel substrates.

DE 103 48 086 A1 describes that a thermoformed and hardened component of high-strength steel is to be provided with a corrosion protection layer comprising a zinc-iron alloy that is to be applied by use of a method for the diffusion of solids. DE 103 48 086 A1 describes using a sherardizing method in a modified form for heat-transfer-sensitive hardened vehicle components.

RU 2 174 159 describes a method wherein the steel component and a saturation mixture containing 80 to 90% of zinc are treated in a tightly sealed rotating container at a temperature of 360 to 470° C. with permanent rotation.

DE 10 2004 035 049 B4 describes a method for Zn for the coating of steel products, such as products made of high-strength steels and products which are molded only with difficulties, by thermal treatment in a container into which the component is inserted simultaneously with a finely dispersed zinc powder and a heat-stabilizing filling material in the form or granules or pellets. The thermal diffusion coating is performed at a temperature of 260 to 320° C.

According to an embodiment of the present invention, the nonferrous metal used is a light metal alloy on the basis of an Al-, Ti- or Mg-alloy, or a Cu alloy.

Surprisingly, after suitable adaptation of temperature control and treatment intensity, the above described methods for the coating of ferrous metal and for the coating of steel can respectively be transferred in an analogous manner to the respective to-be-coated metal on the basis of an Al-, Mg-, Ti- or Cu alloy. For light metal alloys, use can be made of alloys normally employed for construction tasks. According to the present invention, the process of applying the coating onto the components made of nonferrous metal is performed by application of a Zn dust mixture at a temperature in the range of 300 to 600° C. with formation of a zinc diffusion layer.

The nonferrous metal alloys selected according to the present invention are well-used substrates for the application of Zn coatings in form of a zinc diffusion coating. Zn is suited for formation of well-adhering metal alloys or intermediate phases. It is provided that the transition between the substrate metal and the zinc of the coating is not abrupt but, instead, takes place via Zn/metal intermediate phases or alloys.

The substrate materials are also distinguished in that the zinc diffusion coating will not cause a formation of brittle Zn/metal intermediate phases. This is important for application in vehicle components because, in the further processing stages, the coated components will be subjected to partially massive mechanical stresses or further deformation which could cause brittle coatings to flake off. The Zn coating applied according to the present invention and, respectively, the edge region of the component will thus form, together with the substrate, a (relative to the substrate hardness) ductile and closed connection.

When used in connection with a component made of titanium or titanium alloys, the method of the present invention has the advantage that poisonous and environmentally harmful cadmium can be replaced by the zinc thermodiffusion layer as a coating material for protection from corrosion in contact with steel alloys.

Special commercial relevance should be attributed to the use of the zinc thermodiffusion method in aluminum or aluminum alloys. For example, for the copper-containing or stress-crack-prone Al alloys, there can thus be provided an inexpensive alternative to plating with pure Al or, for example, AlZnl. This is of relevance for bodies in aircraft construction.

According to an embodiment of the present invention, the metal surface can be cleaned of oxides prior to the Zn coating process according to the zinc thermodiffusion process. By means of this cleaning process, an additional activation of the metal surface can be effected. Cleaning can be performed by mechanical or chemical means.

According to an embodiment of the present invention, the Zn-diffusion-coated non-ferrous metallic components, for example, being light metal vehicle-body components comprising Al, are provided with a phosphating coating as normally used for corrosion protective treatment of steels. On the surface of the light metal component, such as an aluminum component, there can be obtained, after phosphating, the same process parameters for the subsequent application of organic covering layers (lacquers, such as KTL coatings) as in other zinc-coated components. The mixed-construction components can therefore be processed together after joining.

A further advantage of the zinc diffusion coating resides in the improved adhesion of the surface in organic coatings, lacquers, adhesives or the like.

The zinc diffusion layer also provides an excellent basis for structural bonding, for example, for spot-weld bonding, punch-rivet bonding or blind-rivet bonding. The zinc diffusion layer provides good contact protection in places where nonferrous metal and steel are in mutual abutment without an adhesive.

According to an embodiment of the present invention, the nonferrous-metal component is formed as a metal sheet and, after the coating process, is further shaped by deep drawing. The Zn layers generated by the coating method used according to the present invention adhere so strong and yet so ductile that they can endure a deep drawing process without suffering damage. This holds true, for example, for Al light metal alloys.

The light metal components on the basis of Al-, Ti- or Mg-alloys, which have been coated by the Zn thermodiffusion method, can also be subjected to further treatment by thermoforming. In this regard, it is significant that the thermoforming can be performed in air instead of in a protective gas. The need for a protective gas atmosphere in the furnace is thus obviated. By the Zn coating, the highly oxidation-prone light metals are protected from ingress of air and from oxidation.

A further aspect of the present invention is that the zinc thermodiffusion layer is useful as a lubricant replacement suitable for hot forming. The use of lubricants for the forming tools can therefore be reduced.

The maximum heating temperature for the Zn-coated semi-finished metal sheet of nonferrous metal should be below the melting point of zinc. An advantage of thermal forming compared to the conventional cold deep-drawing is an improved dimensional stability of the components. The thermal forming of the light metals can be carried out in an inexpensive manner by the Zn-thermodiffusion coating.

An aspect of the present invention relates to vehicle body components, for example, for automobiles, in metal hybrid construction or mixed construction, wherein at least one light metal component and a component made of steel are joined to each other. The light metal component provided with a zinc thermodiffusion layer (zinc diffusion layer) prevents a direct contact between the light metal and the steel in the joint region.

For the present invention, the surface of the light metal component should be covered by a zinc diffusion layer. In the joint regions, the contact to the component made of steel is thus effected via the zinc diffusion layer, and a direct contact between the light metal and the steel is avoided.

The voltage drop between the different metal alloys is thereby lowered, and the tendency to corrosion of the less precious partner is considerably reduced.

Components which are to be connected are frequently joined to each other with a mutual overlap, resulting in the formation of a thin gap between the components. In a vehicle body, such a gap is frequently exposed to electrolyte-containing water which bridges the two components in an electrically conducting manner. The generated local elements can thus lead to damaging corrosion phenomena. The usual methods for the sealing of joints or by the KTL (cathodic dip coating or cataphoretic dip coating), the gap region is frequently not reliably coated or sealed. Therefore, it is still possible that water (for example, condensed water or splash water) and other electrolyte-containing carrier liquids can intrude into this gap, with the consequential risk of contact corrosion. Exactly this corrosion, which is much feared in the joining gap, can advantageously be effectively reduced via the zinc diffusion coating of the light metal component.

According to an embodiment of the present invention, the vehicle body component can be coated by a lacquer at least in the region of the joining area. For example, in this regard, a KTL coating is of relevance. The coating can be applied onto the Zn layer of the light metal component. It is also possible to first apply a corrosion protection primer, such as a phosphating layer, and to apply the lacquer layer upon the primer layer.

For the steel component of the mixed-construction component, use can, for example, be made of zinc-coated steel. In this case, the steel can be provided with the usual zinc coatings. For instance, the structural component made of metal can be formed from hot-galvanized sheet metal, for example, by strip galvanizing, wherein sheet metal can be continuously drawn through a bath of molten zinc. A zinc layer protecting the steel from corrosion is thus formed on both sides of the metal sheet.

The steel component can additionally be provided with a corrosion protection primer, optionally on a Zn coating, prior to the joining with the Zn-coated light metal component. Also in this context, a suitable connection technology can reside in using normal thermal and mechanical joining methods as well as bonding. Steel bands with corrosion protection primer are suitable for welding by the usual welding methods.

It is a particulate advantage of the Zn thermodiffusion coating of the light metal component that, with regard to further coatings or lacquers to be applied later, this layer will behave in nearly the same manner as the surface of a zinc-coated steel component. Thus, the mixed-construction component can be subjected to further treatment in common surface-treatment or surface-coating processes. For example, in the Zn-thermodiffusion-coated (Al) light metal components, the pickling for removing the Al-oxide layer and the application of a conversion layer for subsequent further manufacturing process steps, such a bonding or KTL coating, can be eliminated. The precoated semifinished products can be processed in a similar manner to zinc-coated sheet metal—from deep-drawing and joining up to lacquering processes.

The production of aluminum sheet-metal components by use of pre-coated semifinished products made of aluminum sheet-metal is also facilitated or made possible by equipment which is typically designed or optimized for steel sheet metal.

After phosphating as a pretreatment for subsequent organic cover layers, the same process parameters can be obtained on the surface of the light metal component as in other zinc-coated components. For example, the zinc thermodiffusion layer is also conductive and thus weldable and suitable for a subsequent coating with RTL.

In case of a light-metal or steel components or sheets, the present vehicle body component of the mixed-construction type is joined, in the joining regions between the light metal and the steel or the iron alloy, for example, by use of rivet connections without additional bonding.

The vehicle body components are useful especially for automobiles, rail vehicles and aircraft.

The present invention is not limited to embodiments described herein; reference should be had to the appended claims.

The invention claimed is:

1. A method for manufacturing a zinc-coated light nonferrous metal component for the production of a corrosion-protected vehicle body in a mixed construction of a light nonferrous metal component and a steel component, the method comprising:

providing a light nonferrous metal component which has not been treated; and applying a coating by a zinc diffusion onto the light nonferrous metal component by diffusing thereon a zinc dust mixture at a temperature of from 300 to 600° C. so as to form a zinc diffusion layer as the coating, thereby providing the zinc-coated light nonferrous metal component, wherein, the coating prevents an immediate contact between the light nonferrous metal component and the steel component in a joining region, and wherein, the light nonferrous metal component is titanium or a light metal alloy on the basis of titanium.

2. The method as recited in claim 1, further comprising cleaning oxides from a surface of the light nonferrous metal component which has not been treated and activating the surface prior to applying the coating.

3. The method as recited in claim 1, further comprising applying a phosphating layer onto the zinc diffusion layer.

4. The method as recited in claim 1, wherein the light nonferrous metal component which has not been treated is provided as a sheet metal, and further comprising molding the zinc-coated light nonferrous metal component after applying the coating.

5. The method as recited in claim 1, further comprising after-treating by thermoforming in air the zinc-coated light nonferrous metal component.

6. A vehicle body component comprising at least one light nonferrous metal component joined to a steel component, wherein the light nonferrous metal component has a zinc diffusion layer configured to prevent an immediate contact between the light nonferrous metal component and the steel component in a joining region, and wherein the zinc diffusion layer is applied as recited in claim 1.

7. The vehicle body component as recited in claim 6, wherein the steel component is zinc-coated.

8. The vehicle body component as recited in claim 7, wherein the steel component is hot-galvanized.

9. The vehicle body component as recited in claim 6, wherein at least in an area of the joining region, the vehicle body component has a lacquer layer applied directly onto metal surfaces or onto a phosphating layer disposed on the metal surfaces.

10. The vehicle body component as recited in claim 9, wherein the lacquer layer is a cathodic dip coating or cathaphoretic dip coating.

11. The vehicle body component as recited in claim 6, wherein the light nonferrous metal component and the steel component are joined by at least one weld.

12. Method of using a vehicle body component in a motor vehicle, in a metal hybrid construction or a mixed construction, the method comprising:

providing a vehicle body component comprising at least one light nonferrous metal component joined to a steel component, wherein the light nonferrous metal component has a zinc diffusion layer configured to prevent an immediate contact between the light nonferrous metal component and the steel component in a joining region, wherein the zinc diffusion layer is applied as recited in claim 1; and incorporating the vehicle body component in the motor vehicle, in the metal hybrid construction or in the mixed construction.

* * * * *